United States Patent [19]

Plumer, Jr.

[11] 4,093,978

[45] June 6, 1978

[54] METHOD AND APPARATUS FOR PROTECTING ELECTRICAL SYSTEMS FROM LIGHTNING STRIKE EFFECTS

[75] Inventor: John A. Plumer, Jr., Dalton, Mass.

[73] Assignee: General Electric Company, Schenectady, N.Y.

[21] Appl. No.: 644,340

[22] Filed: Dec. 24, 1975

Related U.S. Application Data

[63] Continuation-in-part of Ser. No. 554,127, Feb. 28, 1975, abandoned.

[51] Int. Cl.$^2$ ............................................. H05F 3/00
[52] U.S. Cl. .................................... 361/118; 244/1 A
[58] Field of Search .............. 317/2 E, 17, 61.5; 174/2; 336/220, 186; 244/1 A; 340/27 SS; 361/118, 119, 56

[56] References Cited

U.S. PATENT DOCUMENTS

| | | | |
|---|---|---|---|
| 2,692,372 | 10/1954 | Goldstine | 336/186 X |
| 2,982,494 | 5/1961 | Amason | 317/2 E X |
| 3,428,270 | 2/1969 | Knight et al. | 244/1 A |
| 3,757,168 | 9/1973 | Kreuzer | 317/61.5 X |

*Primary Examiner*—R. N. Envall, Jr.
*Attorney, Agent, or Firm*—Marvin Snyder; Joseph T. Cohen; Donald R. Campbell

[57] ABSTRACT

Electrical apparatus and power distribution systems are protected from lightning strike currents and voltages by the addition of mutually coupled chokes, such as bifilarly wound chokes, in electrical series relationship with the apparatus and the power distribution system to increase the impedance therebetween and cause lightning currents to flow along alternate current paths.

15 Claims, 4 Drawing Figures

U.S. Patent  June 6, 1978  4,093,978
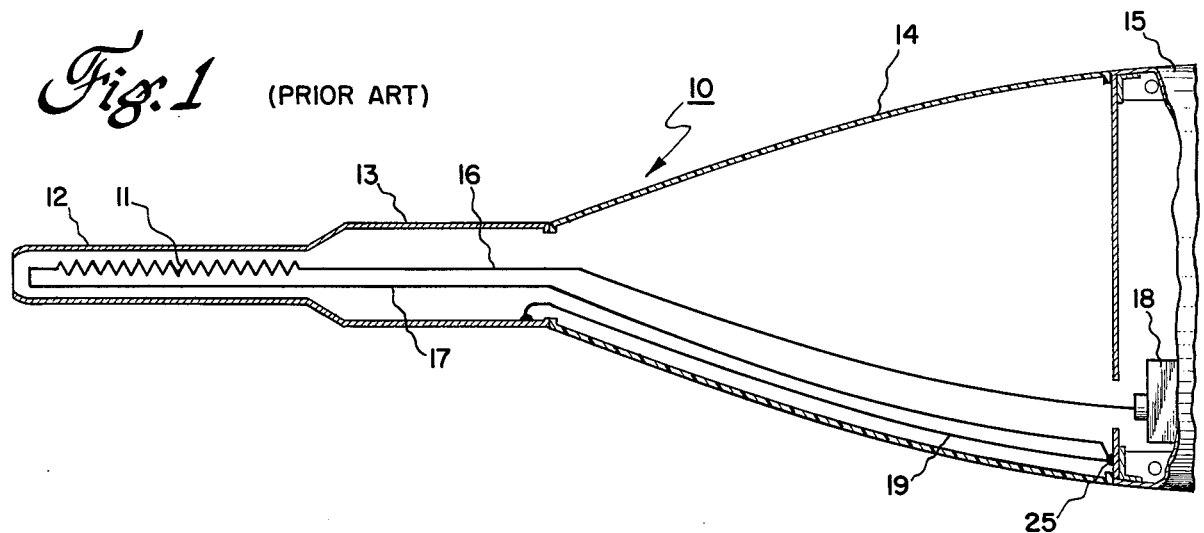
Fig. 1 (PRIOR ART)
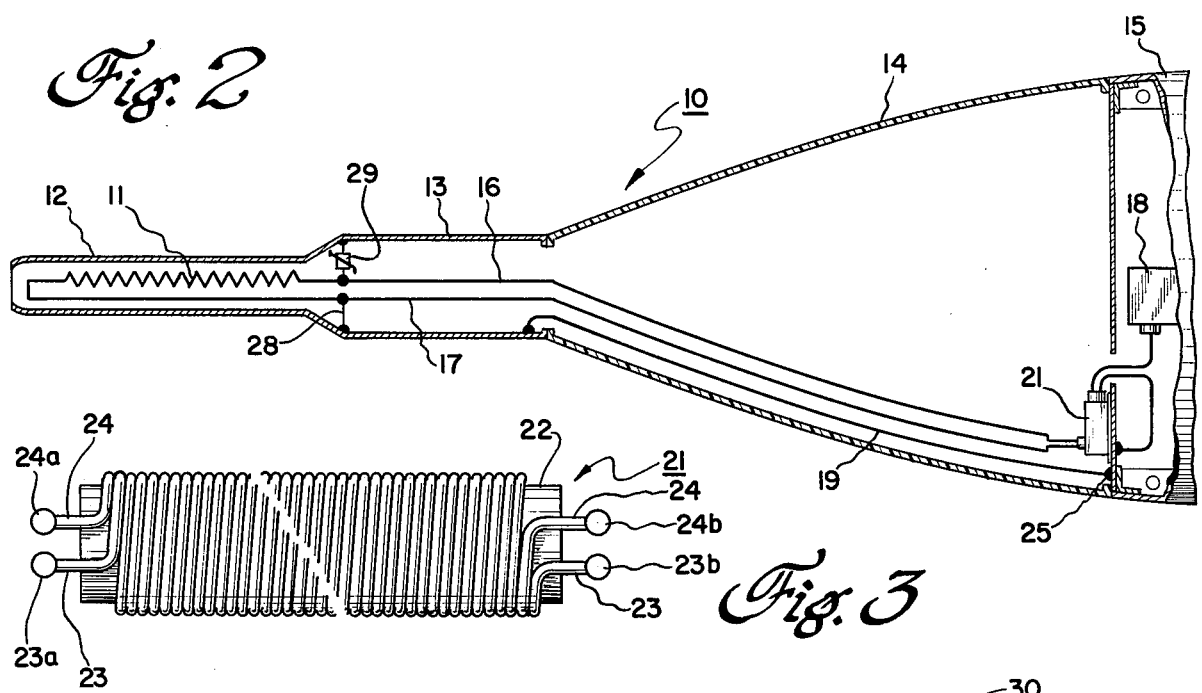
Fig. 2
Fig. 3
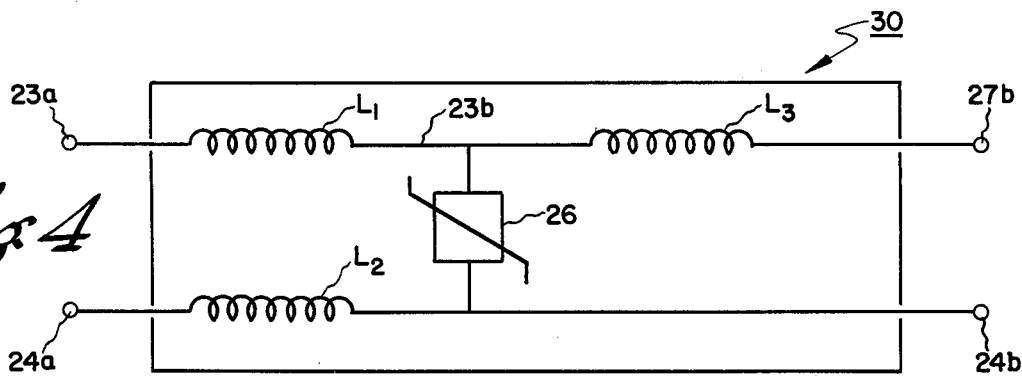
Fig. 4

METHOD AND APPARATUS FOR PROTECTING ELECTRICAL SYSTEMS FROM LIGHTNING STRIKE EFFECTS

This application is a continuation-in-part of U.S. Pat. application Ser. No. 554,127, filed Feb. 28, 1975, now abandoned.

The present invention relates to methods and apparatus for protecting electrical systems from lightning strike currents and lightning-induced surge voltages.

Many electrical systems presently in use lack adequate lightning protection apparatus to prevent lightning strike currents or surge voltages from causing damage to exposed electrical equipment. For example, many aircraft-mounted electrical equipment such as the pitot tube, angle of attack probe, windshield heaters, navigation lights, and flap motors lack adequate lightning current protection. Since such electrical equipment is often located on aircraft extremities where lightning strikes frequently attach, electrical circuits interconnecting these equipments with other on-board systems or power sources may serve as paths by which hazardous lightning strike currents and surge voltages may enter and damage other apparatus and systems aboard the aircraft. For example, in the event of a lightning strike to an aircraft radome-mounted pitot tube, the lightning currents will flow into the tube and from it via the pitot tube ground wire (if present) and heater wires to the main body of the aircraft. Some current will flow in the heater power wires even if a ground wire is present, since the inductance of both paths is generally approximately the same. Additionally, there will be a surge voltage magnetically induced in the heater power circuit in the radome by the lightning current flowing in the parallel ground conductor(s). The lightning currents and surge voltage in the heater power conductors may enter the aircraft electric power distribution bus which provides power to the pitot tube heater and cause damage not only to the power distribution equipment, but possibly other electrical equipment powered from the same bus. Such damage may cause power outage to vital equipment necessary for safe flight. Further, generally the pitot tube heater element and its insulation are permanently damaged by the lightning currents. Accordingly, there is a serious need for adequate lightning strike protection apparatus.

Prior art protective measures which have been utilized in connection with pitot tube heater circuits, for example, include a copper tube enclosing the pitot tube heater power conductors or an isolation transformer between the heater power conductors and the power distribution bus. Unfortunately, both protective measures have not been satisfactory. The copper tube, for example, has been found to distort the aircraft radar performance and hence requires expensive radar recalibration procedures. The isolation transformer, on the other hand, is excessively large and heavy to provide sufficient insulation between the windings to withstand all of the lightning surge voltage which develops along the alternate path being taken by the lightning current from pitot tube to main airframe. Other protective devices across the heater power circuit such as spark gap type arresters have time lag characteristics which permit a high surge voltage to pass through to the bus before the gap fires, and when the gap fires, permit power current to flow through the gap also, tripping the heater power circuit breaker. The circuit breakers (or fuses) usually present in the aircraft provide little or no protection against lightning currents or voltage surges because of their relatively slow reaction times as compared with the rate of rise and duration of most natural lightning strike currents and voltage surges.

Accordingly, it is an object of this invention to provide a method and apparatus which limits to a safe level lightning strike currents entering electrical systems via exposed electrical equipment.

It is another object of this invention to suppress the voltage induced in aircraft mounted electrical equipment such as the pitot tube heater power circuit, for example, by magnetic fields created by the lightning strike current flowing on nearby ground conductor(s).

It is still another object of this invention to provide lightning protection apparatus for exposed electrical equipment which protection apparatus is easily and inexpensively retrofitted to existing equipment or installed initially on new equipment.

Briefly, in accordance with one embodiment of my invention, these and other objects are achieved by the addition of mutually coupled chokes or inductors, such as bifilarly-wound chokes, in electrical series relation with the electrical equipment or system to be protected, such as the pitot tube heater power conductors, for example, and the power distribution bus. The mutually coupled chokes or inductors increase the impedance of the power conductors above that of alternate current paths such as a ground conductor connected between the pitot tube and the aircraft fuselage, thereby causing lightning strike currents entering the pitot tube to be conducted to the aircraft's fuselage along the ground conductor and heater power conductors in inverse proportion to the impedances of the two paths. Appropriate selection of the two impedances insures reliable operation of the aircraft power system and associated distribution buses.

Also in accordance with my invention, the portion of lightning strike current flowing serially in the grounded power conductor of an aircraft mounted electrical equipment (e.g., pitot tube heater) and one of the mutually-coupled chokes, is used to induce a voltage in the other choke which is opposite in polarity to the lightning-induced voltage in the heater power circuit, thereby reducing still further the lightning current and induced voltage entering the power distribution bus.

In accordance with another embodiment of my invention, the lightning-induced voltage appearing across the electrical inputs of a piece of electrical equipment is reduced still further by the use of a voltage lightning device, such as a varistor electrically shunted across the inputs of the electrical equipment on the power distribution bus side of the chokes. An additional inductor in electrical series relation with the mutually coupled choke and the power distribution bus reduces still further any lightning current or surge voltage entering the bus.

Further objects and advantages of my invention, along with a more complete description thereof are provided in the following detailed description taken in conjunction with the accompanying drawings in which:

FIG. 1 is a schematic illustration of an aircraft radome-mounted pitot tube heater element in accord with the prior art;

FIG. 2 is a schematic diagram of an aircraft randome-mounted pitot tube heater element including the protective apparatus in accord with one embodiment of the present invention;

FIG. 3 illustrates a bifilarly wound choke useful in the practice of my invention; and FIG. 4 is an electrical schematic diagram of an electrical surge protection circuit in accord with my invention.

FIG. 1 illustrates a typical aircraft radome-mounted pitot tube heater circuit 10 including a heater element 11 appropriately mounted within a pitot tube 12 which is attached to a boom 13 connecting the pitot tube 12 to the radome 14 which interfaces with the aircraft fuselage 15. As is typical of many types of aircraft, the radome 14 is made of a nonconductive material to permit interference-free operation of a radar system having its antenna located within the radome. As illustrated in FIG. 1, the heater element 11 of the pitot tube is provided with a pair of power conductors 16 and 17 which are generally run along the interior wall of the radome 14 to the aircraft fuselage 15 for eventual connection to a power distribution bus 18 from which power is provided to the heater element. In addition to the power conductors 16 and 17, a ground conductor 19 is also provided between the boom 13 and the aircraft fuselage 15.

As pointed out above, when the unprotected radome-mounted pitot tube heater circuit 10 is subjected to lightning strikes, lightning current is conducted by the ground conductor 19 to the aircraft fuselage. Some lightning current is also conducted by the power conductors 16 and 17 to the power distribution bus 18. In addition, the lightning currents will induce a surge voltage in the heater power circuit. The lightning current and induced voltages entering the bus may cause damage to the power distribution system, the power source, or other aircraft equipment connected to the same power source. In addition, frequently the lightning strike currents entering the power conductors permanently damage the heater element 11 or electrical equipment, thereby necessitating repair or replacement of the equipment.

FIG. 2 illustrates, by way of example, an embodiment of my invention wherein electrical equipment such as an aircraft radome-mounted pitot tube heater circuit 10 is protected from lightning strike currents and induced voltages by the addition of a protection circuit 21 serially connected with the power conductors 16 and 17 and the power distribution bus 18. In one of its simpler forms, as illustrated in FIG. 3, the protection circuit 21 includes a pair of inductors or choke coils $L_1$ and $L_2$ electrically arranged to provide mutual coupling therebetween. More specifically, FIG. 3 illustrates, by way of example, the choke coils $L_1$ and $L_2$ bifilarly wound on an air core insulating form 22 to provide a self-inductance (usually several microhenrys) sufficient to raise the impedance of both power conductors 16 and 17 to a level which causes most of the lightning strike current to flow through the lower impedance ground conductor 19 from the pitot tube 12 and boom 13 to the aircraft fuselage 15. By way of example, a protection circuit constructed with the bifilarly wound choke inductances of approximately 4.35 microhenrys each and connected in electrical series relation with a heater circuit including a ground conductor having approximately 1.5 microhenrys inductance resulted in approximately 85% of total simulated lightning strike current flowing in the ground conductor, and only 15% in the power conductors.

It should be appreciated by those skilled in the art that the practice of my invention is not limited to bifilarly wound chokes or to chokes wound on an air core. Other mutually coupled arrangements of inductors may also be employed, if desired. For example, the inductors may be arranged adjacent each other, either end-to-end or side-by-side. The specific arrangement is a matter of design choice. The use of bifilarly wound chokes wound on a suitable air core form is preferable in many applications primarily because of the improved magnetic coupling, ease of fabrication, and absence of saturation. Similarly, my invention is not limited to lumping all of the choke inductances on a single core. In some instances it would be preferable to distribute the winding along a greater portion of the length of the circuit being protected. For example, and with reference to the protection of the pitot tube heater circuit 10 (illustrated in FIG. 2), the coils $L_1$ and $L_2$ may be wound on one or both of the nonconductive air pressure tubes which commonly extend inside the radome from the pitot tube to the fuselage, with the turns distributed along all or a portion of its length. In another example, the coils $L_1$ and $L_2$ may be wound on the inside surface of the radome, again distributed over all or a portion of its length. These arrangements may, of course, be practiced in a wide variety of aircraft or ground-based equipments other than the radome pitot heater system, such as antennas, street lights, railway signal lights or aircraft navigation lights in which it is desired to keep lightning currents and induced voltage surges out of power or signal conductors leading to this equipment.

In practicing my invention in the manner illustrated in FIG. 3, the bifilarly wound choke coils are formed by winding together two electrically insulated lengths of wire 23 and 24 in the same direction on the air core insulating form 22. The two wires extending from one end of the choke coils represent a first pair of terminals 23a and 24a which are connected to the heater power conductors 16 and 17 respectively, and the ends of the wires at the other end of the choke coil represent a second pair of terminals 23b and 24b which, in the embodiment illustrated in FIG. 2, are connected to the power distribution bus 18 and a common ground terminal 25 associated with the aircraft fuselage, respectively. Those skilled in the art can appreciate that by winding the choke coils in a bifilar manner, the magnetic flux generated by the heater power current flowing through them in opposite directions cancels and thus substantially no impedance to the flow of heater power current is presented by the chokes. This factor is particularly significant since the mere use of two separate chokes which are not magnetically coupled in the manner described above would result in an increase in impedance in the heater circuit, thereby reducing the applied voltage to the heater element itself. The use of bifilarly-wound choke cells obviate this problem.

Still another advantage of my invention results from the fact that the chokes are magnetically coupled together, and that one of the power conductors, conductor 17, is connected to ground terminal 25, whereas the other conductor 16 is connected to the aircraft power distribution bus 18. Since the power distribution bus exhibits some finite series impedance, more lightning current will flow in the lower impedance conductor 17 than in the higher impedance conductor 16. Therefore, current flowing through inductor $L_2$ in the lower impedance conductor 17 becomes a "driving source" from which a voltage is induced into the other inductor $L_1$ which acts to oppose the flow of lightning current in the power conductor 16. This voltage is also of opposite polarity to the voltage induced in the power circuit by magnetic fields created by the lightning current flowing in the heater circuit ground wire 17 and the pitot tube ground wire 19. Hence, lightning current and the lightning-induced voltage appearing across the aircraft power distribution bus 18 are reduced still further.

Still another advantage of employing the bifilarly-wound choke coils results from the fact that the two choke coils can be viewed as a one-to-one transformer wherein a voltage developed across one coil tends to induce a similar voltage in the other adjacent coil and hence the voltage at any adjacent point between the windings is relatively low, thereby minimizing the turn-to-turn insulation required.

As described above, the use of mutually coupled chokes connected in series with the heater power conductors and the aircraft power distribution bus provide a significant reduction in the amount of lightning strike current and induced voltage applied to the distribution bus. However, where desired or necessary, still further reduction of the applied current can be achieved in accord with the embodiment of my invention illustrated in FIG. 4. In this embodiment, in addition to the use of the bifilarly-wound choke 21, for example, a voltage limiting device 26, such as a varistor, is shunted across the second pair of terminals 23b and 24b of the chokes $L_1$ and $L_2$. In addition, an inductor $L_3$ is connected in series relationship with choke $L_1$ and the output terminal 27b, as illustrated. The inductor $L_3$ provides further limiting of the surge voltage appearing at the power distribution bus 18 by permitting the varistor voltage to reach the clamping level while the bus surge voltage is still relatively low. When the varistor clamping level has been reached, the bus surge voltage stops increasing and essentially all of the lightning current flowing through $L_1$ passes through the varistor to ground. The varistor clamping level voltage divides in proportion to the inductances of $L_3$ and the bus, so that if $L_3$ is made much larger than the bus inductance, only a small fraction of the clamping voltage will appear at the bus. Typically, if a bus is 20 microhenrys and if $L_3$ is 600 microhenrys, then about 1/30 of the varistor clamping voltage appears across the bus. At 600 microhenrys, $L_3$ still presents an insignificant impedance to the 400 hertz heater power current.

Advantageously, the mutually coupled choke 21 including inductors $L_1$ and $L_2$ are wound on the insulating form 23 and inductor $L_3$, also wound on a suitable insulating form is positioned at right angles, for example, to the choke 21 to minimize inductive coupling therebetween. The choke 21 and inductor $L_3$ are then enclosed in a suitable housing such a nonmetallic insulating housing 30. In a preferred embodiment, the inductor $L_3$ is positioned inside the choke 21 and at right angles thereto.

Generally, where aircraft-mounted electrical equipment is insulated from a surrounding metal enclosure, such as the pitot tube heater element and pitot tube, a lightning strike on the pitot tube itself creates a large voltage difference between the tube and its heater element. If this voltage exceeds the insulation voltage capability of the heater element, the element will be damaged permanently. Hence, even though the foregoing description of my invention teaches the use of lightning protection apparatus that protects the power distribution bus and associated equipment from damage, it is often desirable also to provide additional protection for the electrical equipment itself. In further accord with my invention and for purposes of illustration with respect to the pitot tube heater element, protection is provided in the manner illustrated in FIG. 2 by an electrical short-circuit 28 provided between the heater element power conductor 17 and the boom 13. Since power conductor 17 is grounded at the ground terminal 25, the short-circuit 28 insures that there is substantially no voltage difference between the pitot tube 12 and one end of the heater element 11. The other end of the heater element, however, is connected to the power distribution bus 18 through power conductor 16 and hence has a voltage applied thereto. To further protect the heater element therefore it is necessary to provide a voltage limiting device 29, such as a varistor, to limit the maximum voltage permitted on the heater element. Obviously, the clamping voltage is selected such that the heater element insulation capability is not exceeded.

In simulated lightning strike tests on an aircraft radome-mounted pitot tube heater circuit including the protection circuit illustrated in FIGS. 2 and 4 and connected in the manner illustrated in FIG. 2, the following table summarizes the voltage surge experienced on a simulated 115 volt, 400 cycle A.C. power bus. The results of Table 1 are illustrated for a protection circuit in which the component values for $L_1$ and $L_2$ were approximately 4.0 microhenrys, $L_3$ was 670 microhenrys, and the varistors 26 and 29 were General Electric Company GE-MOV Model No. V250LA40.

TABLE 1

| | Test Current | | |
|---|---|---|---|
| Test No. | Peak Amplitude | Peak Rate of Rise | Volts on 22 μh bus |
| 1 | 86kA-osc. | 16kA/μs | 50 volts |
| 2 | 93kA-osc. | 17kA/μs | 50 volts |
| 3 | 96kA-osc. | 18kA/μs | 50 v0lts |
| 4 | 95kA-osc. | 18kA/μs | 50 volts |
| 5 | 95kA-osc. | 18kA/μs | 50 volts |
| 6 | 104kA-osc. | 22kA/μs | 50 volts |
| 7 | 112kA-(1st half cycle only) | 24kA/μs | 50 volts |
| 8 | 111kA-osc. | 24kA/μs | 50 volts |

From the foregoing test results in which the aircraft power distribution bus was simulated as having a 22 microhenry series inductance, it can be seen that as the simulated oscillatory lightning strike currents increased from 86 kiloamps through 112 kiloamps, the bus surge voltage was limited to 50 volts, an acceptable and safe value for equipment connected to the distribution bus.

From the foregoing description, those skilled in the art can readily appreciate that the lightning strike protective apparatus and methods described herein substantially reduce lightning strike currents on an aircraft-mounted electrical system and associated power distribution buses to an acceptable and safe level so that neither the exposed electrical equipment (such as the pitot tube heater element) or other electrical systems powered from the same source are damaged by the lightning strike. Further, the lightning protection apparatus described above is easily retrofitted on existing aircraft without requiring additional changes in equipment design or without distorting radar antenna patterns, where such protection apparatus is utilized in a radome-mounted pitot heater system.

Although several emobodiments of my invention have been described with particular reference to the protection of aircraft mounted electrical systems, it is to be understood, of course, that my invention may be practiced on a wide variety of electrical equipments utilized in vastly different environments. For example, my invention can be utilized in conjunction with power utilization equipments such as antennas, street lights, railway signal lights, navigation lights, or other systems such as remotely located satellite power supplies, solar power supplies, fuel cells and other equipments connected to such systems which may be exposed to lightning currents.

In view of the foregoing, it will be apparent to those skilled in the art that various modifications may be made within the spirit and scope of the present invention. Accordingly, the appended claims are intended to cover all such modifications and variations as fall within the true spirit and scope of this invention.

What is claimed as new is:

1. A method of protecting electrical equipment from lightning strike currents and voltages, said method including connecting mutually coupled chokes in electrical series relationship with the power conductors of said electrical equipment and the power distribution bus for said equipment to substantially increase the impedance of said power conductors relative to alternate current paths and thereby cause a substantial portion of the lightning strike current to be conducted along an alternate current path to a common ground and electrically shunting the power distribution bus with a voltage limiting device to limit undesirable voltage increases to an acceptable level.

2. The method of claim 1 further comprising the step of reactively voltage dividing undesirable voltage increases applied to the power distribution bus.

3. The method of claim 2 wherein one of said power conductors is connected to said common ground and wherein the step of connecting mutually coupled chokes further comprises inducing a voltage from said grounded conductor to the other power conductor that diminishes the lightning current and any induced surge voltage that would otherwise enter said distribution bus through said other conductor.

4. The method of claim 1 wherein one of said power conductors is connected to said common ground and wherein the step of connecting mutually coupled chokes further comprises inducing a voltage from said grounded conductor to the other power conductor that diminishes the lightning current and any induced surge voltage that would otherwise enter said distribution bus through said other conductor.

5. A lightning protection device adapted to be connected to an electrical system, said device comprising:
first and second parallel wound, magnetically coupled inductors, each of said inductors having first and second terminals, said first terminals being the input terminals of said protection device;
a third inductor having first and second terminals, said first terminal of said third inductor connected to said second terminal of said first inductor, said second terminals of said second and third inductors being the output terminals of said device; and
a voltage limiting element connected to said first terminal of said third inductor and the second terminal of said second inductor, whereby a voltage or current surge applied to the input terminals of said protective device is reduced substantially at the output terminals.

6. The lightning protection device of claim 5 wherein said voltage limiting device is a varistor.

7. The lightning protection device of claim 6 wherein each of said first and second inductors are bifilarly wound on an air core and an insulating form.

8. The lightning protection device of claim 7 wherein said inductors are enclosed in a housing and said third inductor is positioned relative to said first and second inductors to minimize inductive coupling therebetween.

9. The lightning protection device of claim 8 wherein the inductance of said third inductor is greater than said first or second inductors.

10. In an aircraft mounted electrical system having a high susceptibility to lightning strikes wherein lightning strike currents are conducted from the electrical system along the electrical power cables to a power distribution bus, a protection apparatus for limiting the magnitude of currents and voltages conducted to said bus, said apparatus including:
an electrical ground conductor connected between said electrical system and the main frame portion of said aircraft; and
a pair of magnetically coupled choke coils connected in electrical relation with said electrical power cables to increase the impedance thereof above that of said grounding conductor whereby a substantial portion of a lightning strike current is harmlessly conducted along said ground conductor to said aircraft frame.

11. The protection apparatus of claim 10 further comprising:
a voltage limiting means shunting said electrical power cables at a point between said choke coils and said power distribution bus.

12. The protection apparatus of claim 11 further comprising:
an inductor connected in electrical series relation with one winding of said choke and said power distribution bus, said inductor located between said choke and said bus.

13. The protection apparatus of claim 12 wherein said aircraft mounted electrical system includes a radome-mounted pitot tube heater circuit with a heater element located within the pitot tube and said electrical power cables provide electrical power to said heater element, said power cables extending along the inner walls of said pitot tube and said radome to a power distribution bus adjacent the radome-fuselage interface.

14. The protection apparatus of claim 13 further comprising:
means limiting the voltage difference between said heater element and said pitot tube.

15. The protection apparatus of claim 14 wherein said voltage limiting means comprises:
a voltage limiting device connected between said pitot tube and one terminal of said heater element; and
an electrical short-circuit connection between the other terminal of said heater element and said pitot tube.

* * * * *